United States Patent [19]

Takikawa et al.

[11] Patent Number: 5,090,611
[45] Date of Patent: Feb. 25, 1992

[54] METHOD OF MAKING A CROSS JOINT BETWEEN PIPES

[75] Inventors: Kazunori Takikawa, Numazu; Kazumi Fukaya, Mishima; Jun Ohbu; Yasushi Yagi, both of Shizuoka, all of Japan

[73] Assignee: Usui Kokusai Sangyo Kaisha Ltd., Shizuoka, Japan

[21] Appl. No.: 675,522

[22] Filed: Mar. 26, 1991

[30] Foreign Application Priority Data

Mar. 27, 1990 [JP] Japan .................. 2-75742

[51] Int. Cl.⁵ .............................................. B23K 1/04
[52] U.S. Cl. ............................ 228/173.4; 72/357; 72/370; 29/890.148; 285/156; 285/287
[58] Field of Search .............. 228/170, 173.4, 154; 29/890.14; 285/382.4, 287, 382.5, 156

[56] References Cited

U.S. PATENT DOCUMENTS

| | | | |
|---|---|---|---|
| 1,791,887 | 2/1931 | Davies et al. | 72/357 X |
| 1,817,854 | 8/1931 | Sorensen | 29/890.14 |
| 3,866,457 | 2/1975 | Bagby | 72/370 |
| 3,971,500 | 7/1976 | Kushner et al. | 228/174.3 |
| 3,998,376 | 12/1976 | Haines | 29/890.148 |
| 4,269,438 | 5/1981 | Ridenour | 285/382.5 |

FOREIGN PATENT DOCUMENTS

| | | |
|---|---|---|
| 18-5515 | 3/1943 | Japan . |
| 49-118420 | 10/1974 | Japan . |
| 48309 | 9/1983 | Japan ................. 228/173.4 |

*Primary Examiner*—Kenneth J. Ramsey
*Attorney, Agent, or Firm*—Wenderoth, Lind & Ponack

[57] ABSTRACT

An improved method of making a cross joint between different size pipes is provided. A punch, die and a pressing machine are prepared. The punch includes a center rest for receiving a small pipe, a curved slot and a curved surface for transforming an end of the small pipe. Under the actuation of the pressing machine, the end of the small pipe is transformed into an arcuate configuration which is identical with the inside curvature of a large pipe. Simultaneously, a curved bead is formed on the small pipe remaining circumferentially equal distances from the resultant arcuate edge of the small pipe. This distance is substantially the same as the wall thickness of the large pipe. Utilizing the arcuate edge and the curved bead, the small pipe and the large pipe are welded or brazed together, resulting in a cross joint having no protrusion into the large pipe space.

2 Claims, 5 Drawing Sheets

METHOD OF MAKING A CROSS JOINT BETWEEN PIPES

BACKGROUND OF THE INVENTION

This invention relates to a method of making a cross joint between different size pipes. This method is applicable to a manufacturing process of an ordinary fuel delivery rail which is utilized for an automotive engine equipped with a fuel injection system. This method can be also applied to miscellaneous manufacturing processes for joining a large pipe and a small pipe perpendicularly.

In a conventional fuel delivery rail, a plurality of sockets for receiving respective fuel injectors are interconnected by connecting pipes (see FIG. 11). Each socket is formed in a tubular member having a larger diameter than that of the connecting pipe. Therefore, it is indispensable to make a cross joint between the pipes. As it is well known, it causes several manufacturing problems to make a cross joint between different size pipes. To a wall segment of a large pipe, an aperture of a complicated form should be drilled or machined. On the other hand, to an end of a small pipe, a complicated edge should be formed coincident with the aperture. Nevertheless, a gap is produced in the joint and it causes fuel leakage therefrom.

U.S. Pat. No. 3,971,500 (Kushner et al.) discloses a method of metallurgically joining tubing to a wall segment. In this method, a circumferentially arranged lip means is provided with a small pipe which is inserted into an aperture formed in a wall segment of a large pipe. However, this type of lip means in a form of a ring bead has a disadvantage that it allows the small pipe itself to rotate around the position. This rotation tends to produce a misalignment between the pipes and makes it difficult to keep a precise angular orientation relative to the corresponding fuel injector.

Furthermore, since the edge of the small pipe is cut down at right angles, a portion of the edge protrudes into the inside circle of the large pipe. This portion obstructs the fuel injection flow from a socket to a fuel injector if it is applied to a fuel delivery rail. To make matters worse, this protrusion tends to damage the enclosed parts within the socket, such as a fuel filter element or seal members.

SUMMARY OF THE INVENTION

It is an object of the present invention to provide an improved manufacturing method of a cross joint between different size pipes and to reduce disadvantages of a conventional cross joint.

According to the method of the present invention, in the first place, a punch, die and a pressing machine are prepared. The punch includes a center rest for receiving a small pipe, a curved slot and a curved surface for transforming an end of the small pipe. Under the actuation of the pressing machine, the end of the small pipe is transformed into an arcuate configuration which is identical with the inside curvature of a large pipe. Simultaneously, a curved bead is formed on the small pipe remaining circumferentially equal distances from the resultant arcuate edge of the small pipe. This distance is substantially the same as the wall thickness of the large pipe. Utilizing the arcuate edge and the curved bead, the small pipe and the large pipe are welded or brazed together. Thus, a cross joint having no protrusion into the large pipe space is established.

According to the method, when the resultant arcuate edge of the small pipe is inserted into an aperture of the large pipe, the curved bead acts as a stopper and limits the entering length. Since the curved bead is formed in a configuration which is identical with the outside curvature of the large pipe, the small pipe does not rotate within the aperture. This enables to fix the angular orientation between the small pipe and the large pipe. This is a special result of the curved bead different from the conventional ring bead.

Owing to the curved bead, no gap is produced between the pipes. In addition, the curved bead provides an extended welding area, which can assure the welding results. Also, a stress concentration problem is relieved, whereby the joint strength is improved. A projection welding may be applied to this joint.

According to the method, the arcuate edge and the curved bead are made by a single stroke of the pressing machine. This can simplify the joining process of different pipes remarkably.

Other features and advantages of the invention will become apparent from a reading of the specification, when taken in conjunction with the drawings, in which, like reference numerals refer to like elements in the several views.

DESCRIPTION OF THE PREFERRED EMBODIMENT

Figure 1:
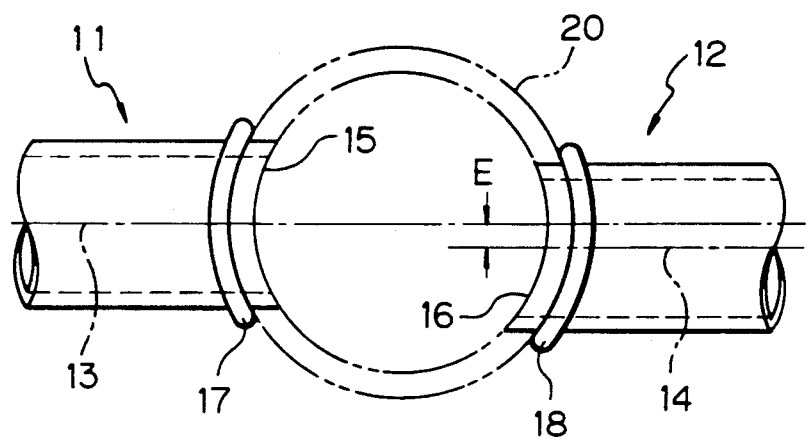
FIG. 1 is a schematic plan view illustrating a cross joint between a small pipe and a large pipe according to the present invention.
Figure 2:
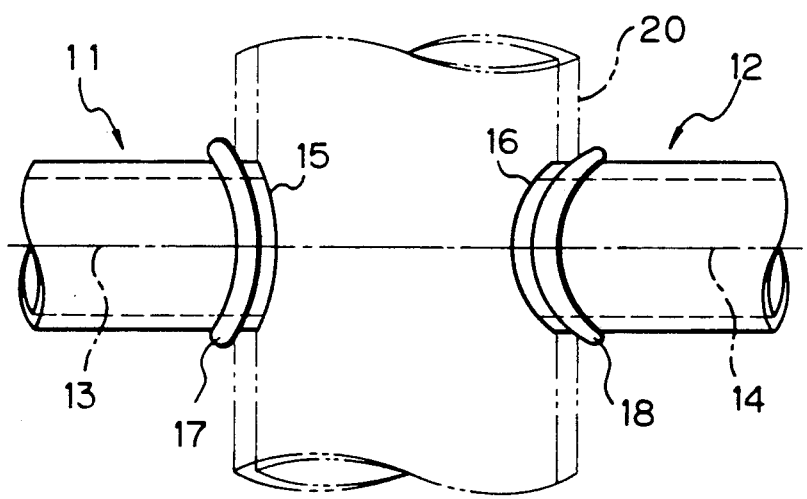
FIG. 2 is a side elevational view of the cross joint of FIG. 1.

Referring to FIGS. 1 and 2, there are shown two types of cross joints made by the method of the present invention. The left-hand cross joint is constructed between a small pipe 11 and a large pipe 20. The axial centerline 13 of the pipe 11 intersects the axial centerline of the pipe 20 at right angles. The right-hand cross joint is constructed between a small pipe 12 and the large pipe 20. The axial centerline 14 of the pipe 12 is arranged slightly offset at a distance E from the axial centerline of the pipe 20.

The distal end 15 of the pipe 11 is transformed into an arcuate configuration which is identical with the inside curvature of the large pipe 20 through the process of the present invention.

The distal end 16 of the pipe 12 is also transformed into a similar configuration.

Apart from the arcuate edge 15 by an equal distance, a curved bead 17 having a double arcuate shape is circumferentially extending around the pipe 11. The remaining distance is substantially the same as the wall thickness of the large pipe 20. Please note that the remaining distance is circumferentially the same length, so that the arcuate edge 15 does not extend into the inside circle of the pipe 20.

Similarly, a curved bead 18 is circumferentially extending around the pipe 12. The remaining distance is also substantially the same as the wall thickness of the large pipe 20. The arcuate edge 16 does not extend into the inside circle of the pipe 20. Please note that the configuration of the curved bead 18 is a little different from that of the curved bead 17 due to the offset length E.

After setting the pipes 11, 12 and 20 into the illustrated positions, welding or brazing operation is applied to the peripheries around the curved beads 17 and 18. Thus, a pair of cross joints are completed.

Figure 3:
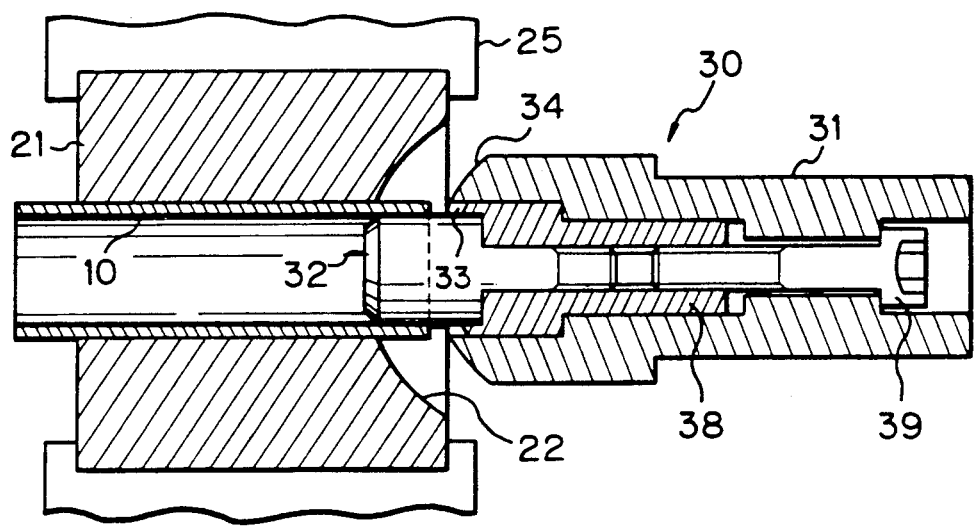
FIG. 3 is a vertical sectional view of a small pipe and a punch attached to a pressing machine.
Figure 4:
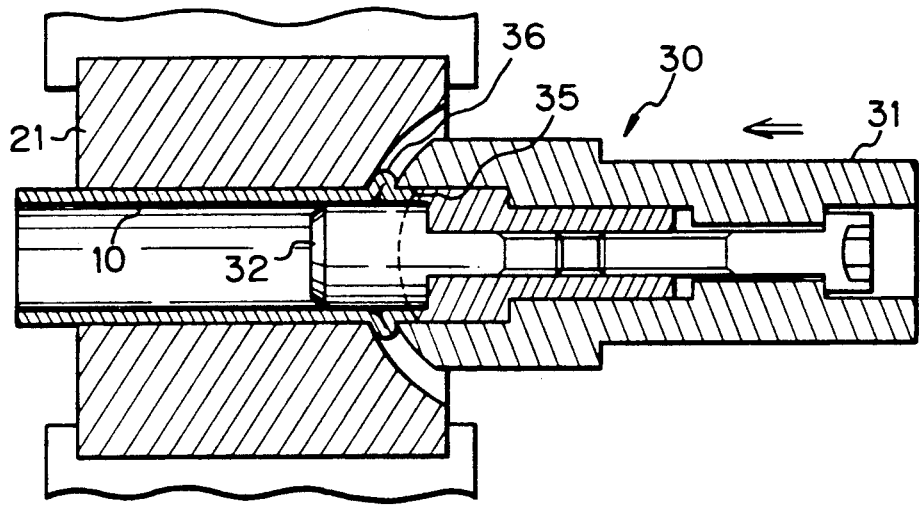
FIG. 4 is a vertical sectional view illustrating a curved bead produced near the end of the small pipe.

FIGS. 3 and 4 show an essential part of a pressing machine for prosecuting the present invention. The arcuate edges 15, 16 and the curved beads 17, 18 shown in FIGS. 1 and 2 are formed by this pressing machine.

The pressing machine comprises a die 21 having an aperture for receiving a blank pipe 10, a punch assembly 30, and a clamp chuck 25 for clamping the die 21.

At the right-hand side of the die 21, an arcuate cavity 22 is provided such that the radius of its curvature is substantially equal to the total dimension of the radius of the large pipe and a width of the curved bead.

On the other hand, at the forward end of the punch assembly 30, there are provided a center rest 32 for centering an end of the blank pipe 10, a compressing slot 33, and a curved surface 34. The compressing slot 33 has a bottom configuration similar to the arcuate edge 15. The above three portions 32, 33, 34 cooperate to form the arcuate edge 15 and the curved bead 17 shown in FIGS. 1 and 2.

In this embodiment, the center rest 32 is bolted to the insert 38 which is enclosed within the housing 31. To the opposite end of the insert 38, a bolt 39 is fixed. It is also possible to make the punch assembly 30 in an integral form. An integral punch assembly may be made from super alloy which is extremely hard. The compressing slot may be engraved by an electrical discharge machine.

As shown in FIG. 3, the forward end of the blank pipe 10 is cut down at right angles and then installed into the pressing machine. The punch assembly 30 moves left so that the center rest 32 is inserted into the blank pipe 10.

FIG. 4 shows an essential step of the invention. As the punch assembly 30 moves left, the forward end of the blank pipe 10 is pushed into the compressing slot 33, whereby the forward end is compressed therein and transformed into a curvature 35 which follows the bottom configuration of the compressing slot 33.

While the forward end is compressed, a wall segment of the pipe 10 moves outwardly into the space between the cavity 22 and the curved surface 34 of the punch assembly 30, resulting in a curved bead 36.

It should be noted that the curvature 35 corresponds to the arcuate edge 15 in FIG. 1, and the curved bead 36 corresponds to the curved bead 17 in FIG. 1.

Figure 5:
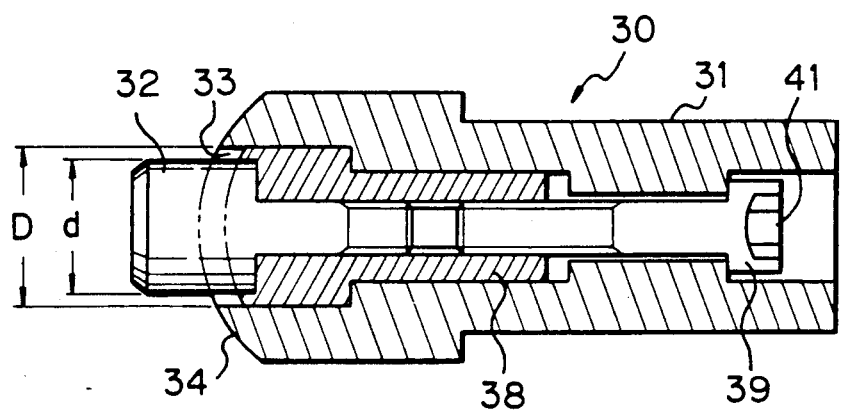
FIG. 5 is a vertical sectional view of the punch.
Figure 6:
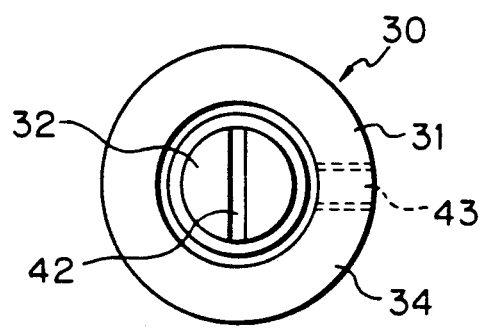
FIG. 6 is a left side elevational view of the punch of FIG. 5.
Figure 7:
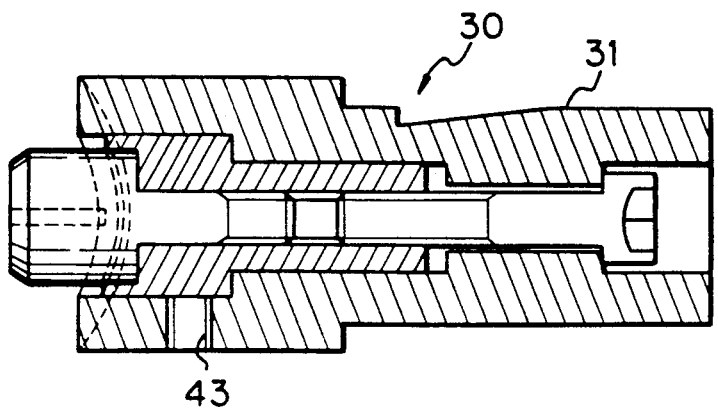
FIG. 7 is a horizontal sectional view of the punch of FIG. 5.

FIGS. 5 to 7 show the detailed construction of the punch assembly 30. In FIG. 5, the diameter D of the compressing slot 33 corresponds to the outside diameter of the blank pipe 10, and the diameter d of the center rest 32 corresponds to the inside diameter of the blank pipe 10, remaining a small clearance therebetween. These clearances can be defined in the most appropriate values considering the machining allowances.

At the center of the head of the bolt 39, a hexagonal slot 41 is provided for receiving a tool head. In FIG. 6, at the head of the center rest 32, a vertical slot 42 is provided for receiving a tool head. At a side surface of the housing 31, a threaded hole 43 is provided for receiving a setting bolt.

Figure 8:
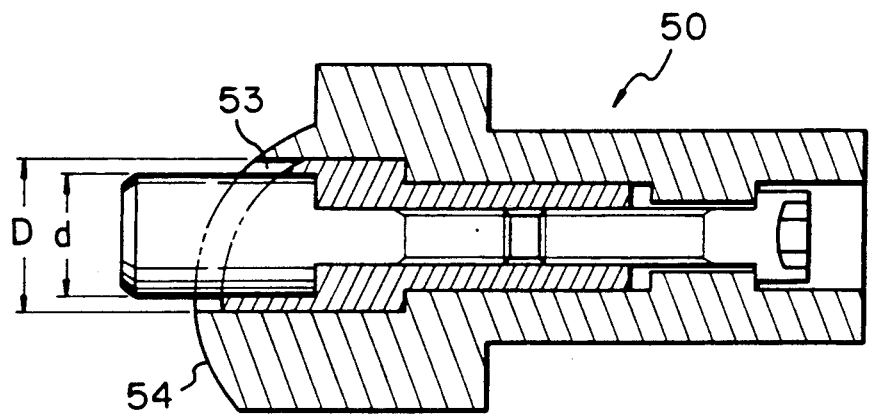
FIG. 8 is a vertical sectional view of another punch for making an eccentric type of cross joint.
Figure 9:
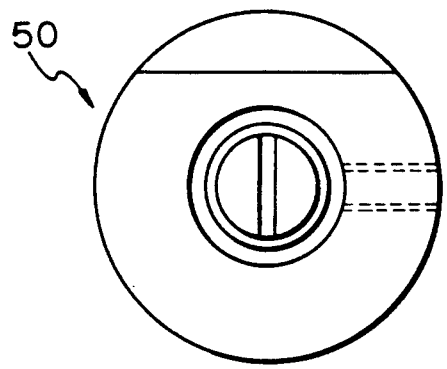
FIG. 9 is a left side elevational view of the punch of FIG. 8.
Figure 10:
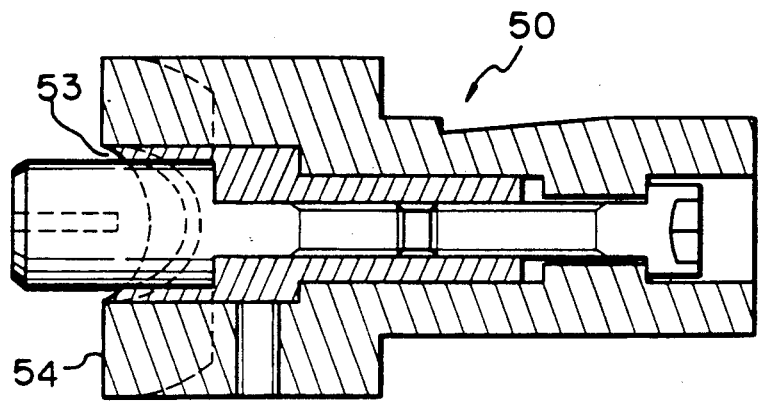
FIG. 10 is a horizontal sectional view of the punch of FIG. 8.

FIGS. 8 to 10 show another punch assembly 50 for making the arcuate edge 16 and the curved bead 18 on the offset-type small pipe 12 in FIG. 1. Similarly to the above-described punch assembly 30, the punch assembly 50 is constructed such that the compressing slot 53 corresponds to the arcuate edge 16 in FIG. 1 and that the curved surface 54 corresponds to the curved bead 18 in FIG. 1. Therefore, by utilizing an associating die together with the punch assembly 50, the objective arcuate edge 16 and the curved bead 18 are made by a pressing machine.

Figure 11:
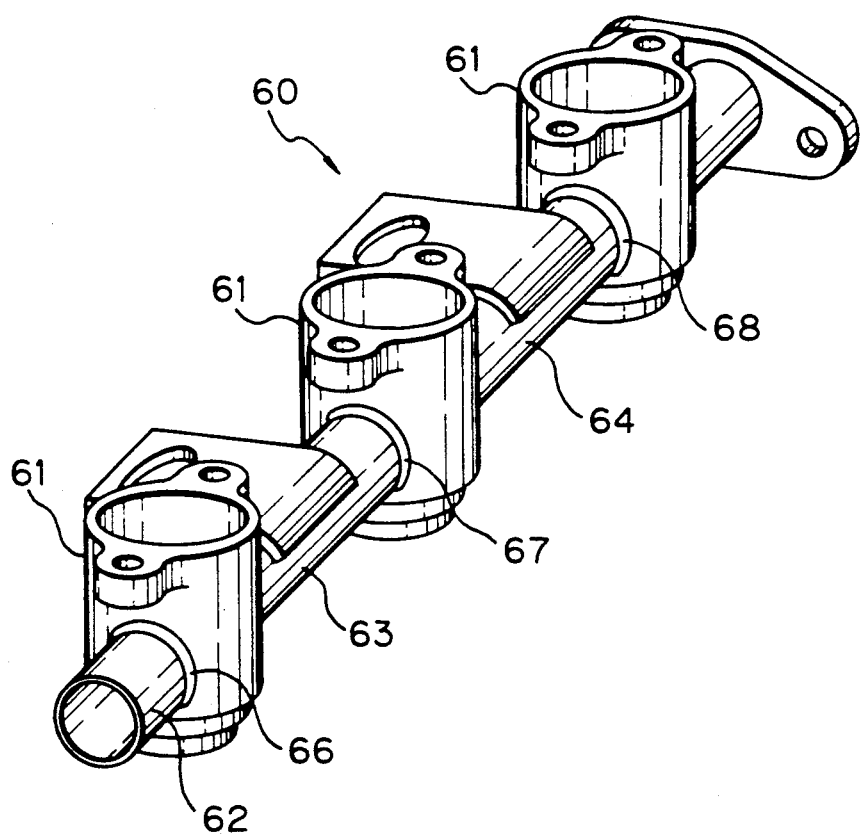
FIG. 11 is a perspective view of a fuel delivery rail produced by the method of the present invention.

FIG. 11 illustrates a fuel delivery rail assembly 60 made through the method of the present invention. Each of the connecting pipes 61, 62, 63 is provided with a curved bead 66, 67, 68, respectively, around which the sockets 61 and the pipes are brazed together.

The curved beads 66, 67, 68 are made in the offset type as shown in the right-hand of FIG. 1. The offset type is preferable to cause a vortex flow within the socket 61.

Since the distal ends of the connecting pipes 62, 63, 64 are formed as shown in FIGS. 1 and 2, there is no protrusion within the inside circle of the socket 61. Thus, the connecting pipes do not obstruct the fuel injection flow from the socket to an injector nozzle. This protrusion-free construction is also desirable to dispose a fuel filter element or seal member such as an O-ring within the socket. These parts are protected from being damaged by a protrusion of a pipe.

It is also possible to apply the symmetrical arcuate edge 15 and the curved bead 17 to the fuel delivery rail assembly 60 in FIG. 11.

I claim:

1. A method of making a cross joint between different size pipes comprising the steps of:
   preparing a punch including a center rest, a curved slot and a curved surface, said curved slot having a bottom configuration corresponding to an inside curvature of a large pipe,
   setting a small pipe and the punch to a die and a pressing machine,
   inserting the center rest of the punch into a distal end of the small pipe,
   moving the punch toward the small pipe, thereby transforming the distal end into an arcuate edge identical with the corresponding inside curvature of the large pipe,
   forming a curved bead on the small pipe, said curved bead being disposed circumferentially at an equal distance from the resultant edge of the small pipe, said distance being substantially the same as the wall thickness of the large pipe,
   detaching the small pipe from the pressing machine,
   inserting the arcuate edge of the small pipe into an aperture of the large pipe, and
   welding or brazing around the curved bead.

2. A method of making a cross joint as claimed in claim 1, further comprising the step of cutting down an end of a small pipe at right angles before setting it to a pressing machine.

* * * * *